United States Patent
Whelan et al.

(10) Patent No.: US 7,493,814 B2
(45) Date of Patent: Feb. 24, 2009

(54) VIBRATORY GYROSCOPE WITH PARASITIC MODE DAMPING

(75) Inventors: David Whelan, Newport Coast, CA (US); A. Dorian Challoner, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 35 days.

(21) Appl. No.: 11/615,872

(22) Filed: Dec. 22, 2006

(65) Prior Publication Data

US 2008/0148846 A1    Jun. 26, 2008

(51) Int. Cl.
 *G01P 9/04* (2006.01)
(52) U.S. Cl. .................. 73/504.12; 73/504.13
(58) Field of Classification Search .............. 73/504.12, 73/504.04, 504.14, 504.15, 504.13, 1.77, 73/1.37–1.38, 504.02
See application file for complete search history.

(56) References Cited

U.S. PATENT DOCUMENTS

| | | | | |
|---|---|---|---|---|
| 5,383,362 | A * | 1/1995 | Putty et al. .............. | 73/504.01 |
| 6,467,346 | B1 * | 10/2002 | Challoner et al. ........ | 73/504.02 |
| 6,675,630 | B2 * | 1/2004 | Challoner et al. ............ | 73/1.77 |
| 6,944,931 | B2 | 9/2005 | Shcheglov et al. | |
| 7,040,163 | B2 | 5/2006 | Shcheglov et al. | |
| 7,159,441 | B2 * | 1/2007 | Challoner et al. ............ | 73/1.77 |

OTHER PUBLICATIONS

PCT/US2007/088286 International Search Report and Written Opinion.

* cited by examiner

*Primary Examiner*—Helen C. Kwok
(74) *Attorney, Agent, or Firm*—Bradley K. Lortz; Canady & Lortz LLP

(57) ABSTRACT

Operation of a planar resonator gyroscope with in-plane parasitic modes of vibration to obtain improved performance is disclosed. A planar resonator gyroscope, such as a disc resonator gyroscope, may be operated with embedded electrodes. The embedded electrodes may be disposed adjacent to the planar resonator and proximate to one or more anti-nodes of a parasitic vibration mode. A sensed amplitude of the parasitic mode is applied in differential signals used to operate the gyroscope. A feedback controller for damping the parasitic mode applies a drive voltage generated from the proportional voltage to one or more drive electrodes adjacent to the planar resonator disposed proximate to one or more anti-nodes of the parasitic vibration mode of the planar resonator. Parasitic in-plane modes may be thus damped in operating the gyroscope with active damping applied through an analog operational amplifier or digital feedback.

20 Claims, 13 Drawing Sheets

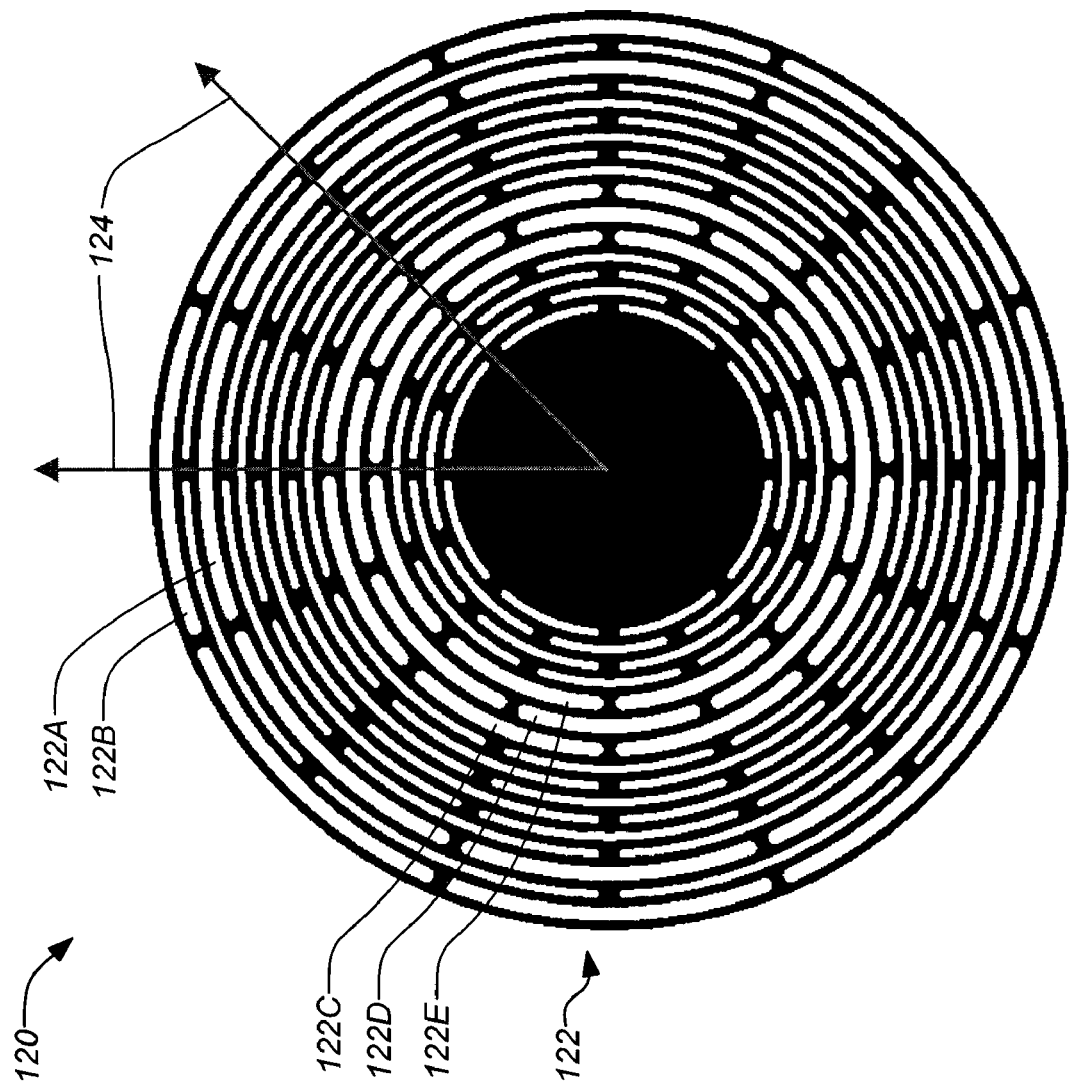

VIBRATORY GYROSCOPE WITH PARASITIC MODE DAMPING

CROSS-REFERENCE TO RELATED APPLICATIONS

This application is related to the following co-pending patent applications, which are both incorporated by reference herein:

U.S. patent application Ser. No. 11/371,596, filed on Mar. 9, 2006, and entitled "ISOLATED PLANAR GYROSCOPE WITH INTERNAL RADIAL SENSING AND ACTUATION", by Kirill V. Shcheglov et al., published as U.S. 2006/0162146A1; and U.S. patent application Ser. No. 11/199,004, filed Aug. 8, 2005, and entitled "INTEGRAL RESONATOR GYROSCOPE", by Kirill V. Shcheglov et al., published as U.S. 2005/0274183A1.

BACKGROUND OF THE INVENTION

1. Field of the Invention

The present invention relates to gyroscopes, and in particular to planar resonator gyroscopes or inertial sensors and their operation. More particularly, this invention relates to the control and damping of isolated planar resonator inertial sensors and gyroscopes.

2. Description of the Related Art

Mechanical gyroscopes are used to determine direction of a moving platform based upon the sensed inertial reaction of an internally moving proof mass. A typical electromechanical gyroscope comprises a suspended proof mass, gyroscope case, pickoffs, torquers and readout electronics. The inertial proof mass is internally suspended from the gyroscope case that is rigidly mounted to the platform and communicates the inertial motion of the platform while otherwise isolating the proof mass from external disturbances. The pickoffs to sense the internal motion of the proof mass, the torquers to maintain or adjust this motion and the readout electronics that must be in close proximity to the proof mass are internally mounted to the case which also provides the electrical feedthrough connections to the platform electronics and power supply. The case also provides a standard mechanical interface to attach and align the gyroscope with the vehicle platform. In various forms gyroscopes are often employed as a critical sensor for vehicles such as aircraft and spacecraft. They are generally useful for navigation or whenever it is necessary to autonomously determine the orientation of a free object.

Older conventional mechanical gyroscopes were very heavy mechanisms by current standards, employing relatively large spinning masses. A number of recent technologies have brought new forms of gyroscopes, including optical gyroscopes such as laser gyroscopes and fiberoptic gyroscopes as well as mechanical vibratory gyroscopes.

Spacecraft generally depend on inertial rate sensing equipment to supplement attitude control. Currently this is often performed with expensive conventional spinning mass gyros (e.g., a Kearfott inertial reference unit) or conventionally-machined vibratory gyroscopes (e.g. a Litton hemispherical resonator gyroscope inertial reference unit). However, both of these are very expensive, large and heavy.

In addition, although some prior symmetric vibratory gyroscopes have been produced, their vibratory momentum is transferred through the case directly to the vehicle platform. This transfer or coupling admits external disturbances and energy loss indistinguishable from inertial rate input and hence leads to sensing errors and drift. One example of such a vibratory gyroscope may be found in U.S. Pat. No. 5,894,090 to Tang et al. which describes a symmetric cloverleaf vibratory gyroscope design and is hereby incorporated by reference herein. Other planar tuning fork gyroscopes may achieve a degree of isolation of the vibration from the baseplate, however these gyroscopes lack the vibrational symmetry desirable for tuned operation.

In addition, shell mode gyroscopes, such as the hemispherical resonator gyroscope and the vibrating thin ring gyroscope, are known to have some desirable isolation and vibrational symmetry attributes. However, these designs are not suitable for or have significant limitations with thin planar silicon microfabrication. The hemispherical resonator employs the extensive cylindrical sides of the hemisphere for sensitive electrostatic sensors and effective actuators. However its high aspect ratio and three-dimensional curved geometry is unsuitable for inexpensive thin planar silicon microfabrication. The thin ring gyroscope (e.g., U.S. Pat. No. 6,282,958, which is incorporated by reference herein) while suitable for planar silicon microfabrication, lacks electrostatic sensors and actuators that take advantage of the extensive planar area of the device. Moreover, the case for this gyroscope is not of the same material as the resonator proof mass so that the alignment of the pickoffs and torquers relative to the resonator proof mass change with temperature, resulting in gyroscope drift.

Vibration isolation using a low-frequency seismic support of the case or of the resonator, internal to the case is also known (e.g., U.S. Pat. No. 6,009,751, which is incorporated by reference herein). However such increased isolation comes at the expense of proportionately heavier seismic mass and/or lower support frequency. Both effects are undesirable for compact tactical inertial measurement unit (IMU) applications because of proof mass misalignment under acceleration conditions.

Furthermore, the scale of previous silicon microgyroscopes (e.g., U.S. Pat. No. 5,894,090) can not been optimized for navigation or pointing performance resulting in higher noise and drift than desired. This problem stems from dependence on out of plane bending of thin epitaxially grown silicon flexures to define critical vibration frequencies that are limited to 0.1% thickness accuracy. Consequently device sizes are limited to a few millimeters. Such designs exhibit high drift due to vibrational asymmetry or unbalance and high rate noise due to lower mass which increases thermal mechanical noise and lower capacitance sensor area which increases rate errors due to sensor electronics noise.

Scaling up of non-isolated silicon microgyros is also problematic because external energy losses will increase with no improvement in resonator Q and no reduction in case-sensitive drift. An isolated cm-scale resonator with many orders of magnitude improvement in three-dimensional manufacturing precision is required for very low noise pointing or navigation performance.

Conventionally machined navigation grade resonators such as quartz hemispherical or shell gyros have the optimum noise and drift performance at large scale, e.g. 30 mm and three-dimensional manufacturing precision, however such gyros are expensive and slow to manufacture. Micromachined silicon vibratory gyroscopes have lower losses and better drift performance at smaller scale but pickoff noise increases and mechanical precision decreases at smaller scale so there are limits to scaling down with conventional silicon designs. Conventional laser trimming of mechanical resonators can further improve manufacturing precision to some degree. However this process is not suitable for microgyros with narrow mechanical gaps and has limited resolution, necessitating larger electrostatic bias adjustments in the final tuning process.

Most recently, some planar resonator gyroscopes devices have been developed (such as a disc resonator gyroscope) which operate through the excitation and sensing of in-plane vibrational modes of a substantially solid planar resonator. These planar resonators obtain enhanced properties over designs such as the hemispherical or shell resonators by enabling greater drive and sensing area in a compact package that is more easily manufactured and packaged. For example, see U.S. Pat. No. 6,944,931 by Shcheglov et al., issued Sep. 20, 2005 and entitled "INTEGRAL RESONATOR GYROSCOPE" and U.S. Pat. No. 7,043,163 by Shcheglov et al., issued May 9, 2006 and entitled "ISOLATED PLANAR GYROSCOPE WITH INTERNAL RADIAL SENSING AND ACTUATION."

In view of the foregoing, there is a need in the art for small, inexpensive, manufacturable planar gyroscopes with greatly improved performance for navigation and spacecraft payload pointing and other applications. To this end, there is also a need for systems and methods to operate such gyros to enhance their performance. As detailed below, the present invention satisfies these and other needs.

SUMMARY OF THE INVENTION

Operation of a planar resonator gyroscope to obtain improved performance is disclosed. High quality planar resonators have an isolated degenerate vibratory mode pair, or differential mode pair used for inertial rate sensing and other parasitic vibratory modes that may become excited and produce rate sensing errors. A planar resonator gyroscope, such as a disc resonator gyroscope, having a resonator with extensive vertical and horizontal surfaces to for capacitive electrodes may be operated to actively damp one or more parasitic in-plane or out-of-plane modes of vibration. The electrodes are arranged in distinct sets of drive and sense electrodes adjacent to the resonator at antinodes of the parasitic mode. For the lowest frequency in-plane parasitic mode, or common mode, an electrode set may comprise an opposing pair on opposite sides of a central mounting point of the resonator. One electrode of the pair is thereby adjacent say a positive antinode of the common mode while the second electrode of the pair is adjacent a negative antinode. The in-plane differential mode used for rate sensing may have antinodes adjacent each electrode however they are always of the same polarity. A drive differential signal is applied to an opposing pair of drive electrodes and a sense differential signal is determined between an opposing pair of the sense electrodes. Differential signals with respect to the common mode are thus preferably used to operate the gyroscope to actively damp the parasitic common mode so that there is no damping or disturbance of the two differential modes of vibration used for inertial rate sensing feedback control signals applied to the set of differential drive electrodes are based on the sense differential signal. Parasitic in-plane modes may be thus damped in operating the gyroscope with active damping applied through an analog operational amplifier or digital feedback.

A typical method embodiment of the invention comprising operating a planar resonator including the steps of sensing an amplitude of a parasitic vibration mode of a planar resonator with one or more sense electrodes of a plurality of capacitive electrodes adjacent to the planar resonator disposed proximate to one or more anti-nodes of the parasitic vibration mode of the planar resonator, generating a proportional voltage to the amplitude of the parasitic vibration mode, and damping the parasitic mode by applying a drive voltage generated from the proportional voltage to at least one or more drive electrodes of the plurality of capacitive electrodes adjacent to the planar resonator disposed proximate to the one or more anti-nodes of the parasitic vibration mode of the planar resonator. The planar resonator may comprise a disc resonator. Further, the disc resonator may comprise a centrally mounted and circumferentially slotted disc and the plurality of capacitive electrodes comprise embedded electrodes within the disc resonator. The one or more sense electrodes may be disposed peripheral to the one or more drive electrodes around the disc resonator. Typically, the planar resonator is operated as a gyroscope to measure rotation of the planar resonator. Control of the resonator may be developed with the proportional voltage being generated with either an analog or a digital control circuit. The applying the drive voltage may comprise actively controlling a common mode position and velocity using wideband DC capacitive sensing.

In some embodiments, the one or more sense electrodes may comprise a plurality of partitioned sense electrodes to provide a differential sense signal to sense the amplitude of the parasitic vibration mode. In this case, the planar resonator may comprise a disc resonator having a central mounting point and the plurality of partitioned sense electrodes to sense the amplitude of the parasitic vibration mode are partitioned between one or more inboard sense electrodes and one or more outboard sense electrodes.

Similarly, a sensor embodiment of the invention may comprise a planar resonator and a plurality of capacitive electrodes disposed adjacent to the planar resonator and proximate to one or more anti-nodes of the parasitic vibration mode of the planar resonator. The plurality of capacitive electrodes may include one or more sense electrodes for sensing an amplitude of a parasitic vibration mode of the planar resonator. A sensing circuit is used for generating a proportional voltage to the amplitude of the parasitic vibration mode and a feedback controller is used for damping the parasitic mode by applying a drive voltage generated from the proportional voltage to at least one or more drive electrodes of the plurality of capacitive electrodes adjacent to the planar resonator disposed proximate to the one or more anti-nodes of the parasitic vibration mode of the planar resonator. Sensor embodiments of the invention may be further modified consistent with the method embodiments described herein for operating a planar resonator.

A further embodiment of the present invention may comprise a method of operating a planar resonator, including the steps of partitioning at least one set of drive electrodes into an opposing drive pair on opposite sides of a central mounting point of a planar resonator, partitioning at least one set of sense electrodes into an opposing sense pair on opposite sides of a central mounting point of the planar resonator, determining a drive differential signal between the opposing drive pair of the drive electrodes, determining a sense differential signal between the opposing sense pair of the sense electrodes, and applying feedback control signals to the set of drive electrodes based on the drive differential signal and the sense differential signal. The planar resonator may be a disc resonator and may be operated as a gyroscope to measure rotation of the planar resonator. The electrodes selected for parasitic mode damping may be combined to yield sense and drive signals such that the differential modes or Coriolis modes used for rate sensing are neither observable nor controllable.

Applying the feedback control signals to the set of drive electrodes may comprise actively damping at least one parasitic vibration mode of the planar resonator. Actively damping the at least one parasitic vibration mode of the planar resonator may be applied with a proportional controller applied to the sense differential signal. For example, if the resonator motion is sensed with a pair of transimpedance amplifiers connected to the embedded differential sense electrodes then the output voltage difference signal is proportional to resonator velocity and a fixed negative feedback gain is used to form a voltage drive to the corresponding differential control electrodes. The proportional controller may be implemented with an analog or digital control circuit.

In some embodiments a first set of drive electrodes may be disposed along a first axis of a first vibration mode of the planar resonator and a first set of sense electrodes disposed orthogonally to the first axis. Applying the feedback control signals comprises driving and sensing the first vibration mode. Further, a second set of drive electrodes may be disposed along a second axis of a second vibration mode of the planar resonator and a second set of sense electrodes disposed orthogonally to the second axis. Applying the feedback control signals comprises driving and sensing the second vibration mode.

In some embodiments, applying the feedback control signals may also comprise first narrow-band filtering the signal around the parasitic mode frequency to prevent any disturbance to the Coriolis mode used for rate sensing due to unbalance in the differential electrodes sensitive to the parasitic mode motion. Alternatively, one or more electrodes adjacent to the planar resonator at an antinode of a parasitic vibratory mode that are connected without forming differential pairs to yield a signal proportional to antinode motion may suffice with narrow band filtering for controlling the planar resonator to actively damp the parasitic mode without disturbing rate sensing.

A planar resonator such as the disc resonator, having extensive vertical and horizontal surfaces, allows numerous other electrode arrangements to be used for active parasitic mode damping. For example, separate embedded electrodes adjacent vertical ring surfaces not used for rate sensing electrodes may be used for parasitic in-plane mode damping or electrodes placed beneath or above the rings on the base or cap surfaces may be used for parasitic out-of-plane mode damping, such as the first axial mode or the first two rocking modes of the disc resonator.

Similarly, another sensor embodiment of the invention comprises a planar resonator having at least one set of drive electrodes partitioned into an opposing drive pair on opposite sides of a central mounting point of a planar resonator and at least one set of sense electrodes partitioned into an opposing sense pair on opposite sides of a central mounting point of the planar resonator, and a control circuit for determining a drive differential signal between the opposing drive pair of the drive electrodes, determining a sense differential signal between the opposing sense pair of the sense electrodes, and applying feedback control signals to the set of drive electrodes based on the sense differential signal. Further sensor embodiments of the invention may be further modified consistent with the method embodiments described herein for operating a planar resonator.

BRIEF DESCRIPTION OF THE DRAWINGS

Referring now to the drawings in which like reference numbers represent corresponding parts throughout:

FIG. 1C illustrates a pattern for an exemplary planar resonator structure operable with an embodiment of the present invention;

DETAILED DESCRIPTION OF THE PREFERRED EMBODIMENT

1. Overview

Figure 1A:
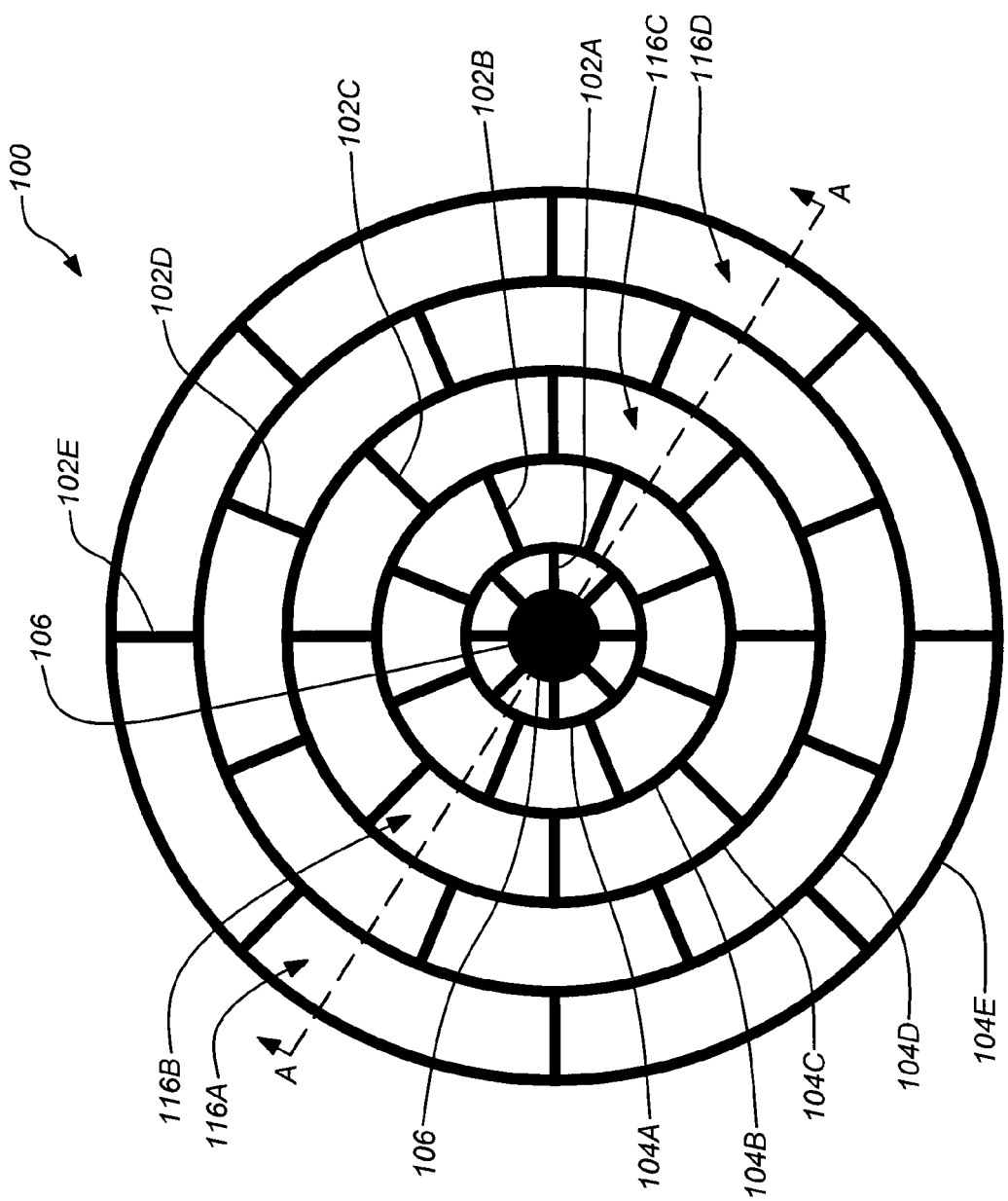
FIG. 1A depicts a schematic top view of an isolated resonator for the gyroscope or inertial sensor which may be operated in accordance with an embodiment of the invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

As previously described, embodiments of the present invention can be applied to a planar resonator supported on a central rigid stem and with substantially increased sensing capability by utilizing a short solid cylindrical resonator or disc having a substantial useable internal resonator volume, allowing the incorporation of significantly more sensing for the measurement of desirable resonator internal motion. This use of a planar element, such as a disc, rather than a shell or ring results in substantial top and bottom surface areas and a large internal volume for mounting additional sensors. A disc provides the same favorable radial modes as a cylindrical shell.

Embodiments of the present invention generally describe an isolated planar vibratory gyroscope. Generally, embodiments of the invention employ embedded sensing and actuation providing a planar micromachined silicon gyroscope having desirable axisymmetric resonator with single central nodal support, integral (and distributed) proof mass and flexural suspension and extensive capacitive electrodes with large total area. Advantageously, the entire resonator, embedded electrodes and integral case wall of the present invention can be fabricated from a single wafer of silicon.

Silicon ring resonators (e.g., U.S. Pat. No. 6,282,958) do not have large area internal capacitive sensors and actuators and require flexible support beams. Other quartz hemispherical resonator gyroscopes are three dimensional so they cannot be micromachined and do not have embedded electrodes. Although post mass type resonator gyroscopes have high angular gain, large area sensing elements and hence superior noise performance to other designs, they do not have the optimized resonator isolation properties of a single central nodal support and often employ a discretely assembled post proof mass. Further, integrally made, fully differential embedded electrodes as with the present invention, desirable for better thermal and vibration performance, are not possible with a discrete post proof mass resonator gyroscope or out of plane gyroscope.

The principal problems with ring gyroscopes are the inherently small sensor area around a thin ring and the flexibility or interaction of the support beams. A three dimensional hemispherical gyroscope has taller sides for large area capacitive sensing, but still requires assembly of a discrete circumferential electrode cylinder or cup for sensing and excitation. A tall cylinder with central support and circumferential electrodes also faces this problem. A short solid cylinder or disc with a central support and piezoelectric and/or electromagnetic wire sensors and actuators, mounted to the top or bottom surface of the disc solves the problem of non-embedded sensors with small area. However, a preferred embodiment of this invention is a multiply slotted disc resonator illustrated in exemplary embodiment described hereafter.

2. Exemplary Planar Resonator Gyroscope

FIG. 1A depicts a schematic top view of an isolated resonator for the gyroscope or inertial sensor which may be operated in accordance with an embodiment of the invention. The gyroscope comprises a unique planar resonator 100 which is supported by a rigid central support 106 and designed for in-plane vibration. In the exemplary embodiment, the resonator 100 comprises a disc that includes a number of slots, e.g. 116A-116D (generally referenced as 116) formed from concentric circumferential segments 104A-104E. The circumferential segments 104A-104E are supported by radial segments 102A-102E. The overall diameter of the resonator can be varied depending upon the performance requirements. For example, a 16 mm diameter resonator can provide relatively high machining precision and low noise. Further refinement of the resonator can yield a resonator diameter of only 4 mm at significantly reduced cost.

Figure 1B:
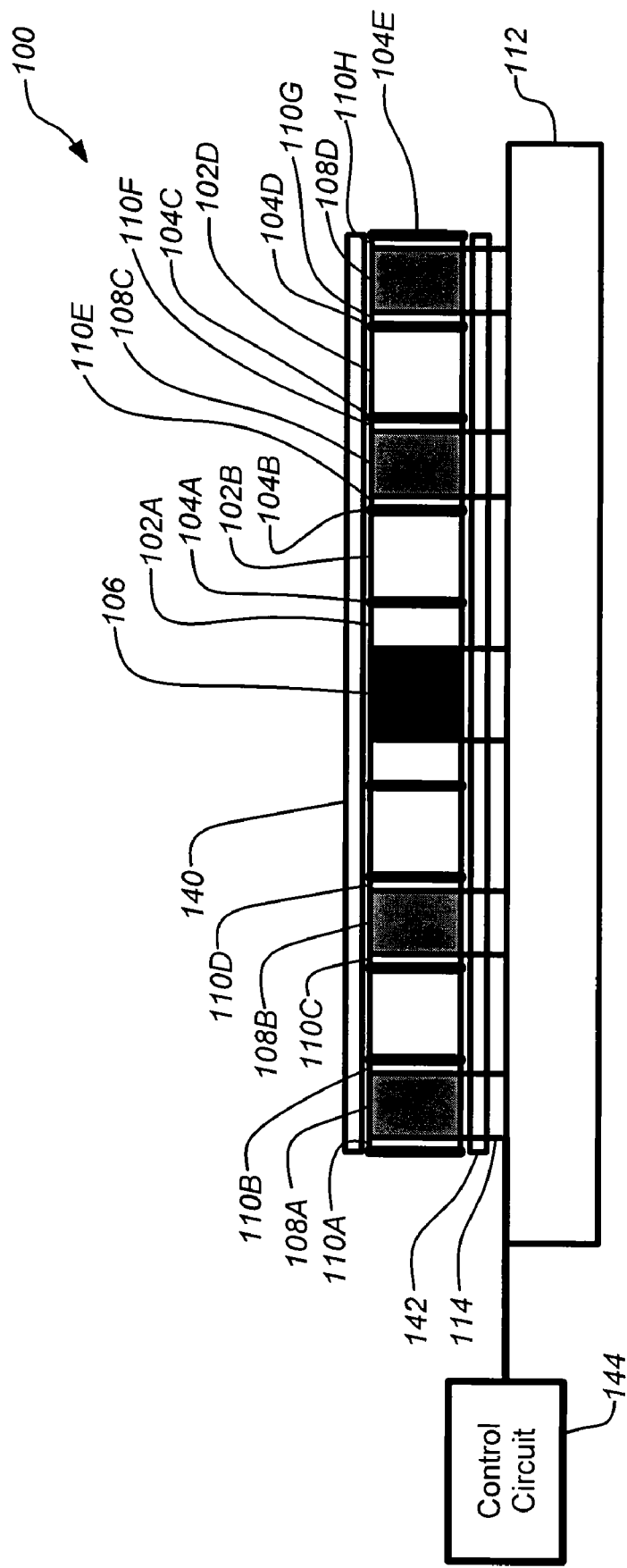
FIG. 1B depicts a side view of the exemplary planar resonator gyroscope of FIG. 1A.

FIG. 1B depicts a schematic side view of an exemplary isolated resonator 100 of the present invention assembled into a baseplate 112. The central support 106 supports the resonator 100 on the baseplate 112. At least some of the slots 116 in the resonator 100 provide access for the embedded electrodes 108A-108D which are also supported on pillars 114 on the baseplate 112. The electrodes 108A-108D form capacitive gaps 110A-110H (outboard gaps 110A, 110C, 110F and 110H and inboard gaps 110B, 110D, 110E and 110G) with at least some of the circumferential segments 104A-104E of the resonator 100. These electrodes 108A-108D provide for radial excitation of the resonator 100 as well as sensing motion of the resonator 100. To facilitate this each of the electrodes 108A-108D is divided into multiple separate elements to improve control and sensing of the resonator. For example, the annular electrode 108B as shown can be divided into two or more elements, at least one acting across the outboard gap 110C and at least one acting across the inboard gap 110D. Vibration is induced in the resonator by separately exciting the elements to produce a biased reaction on the resonator 100 at the electrode 108B location.

In general, the excitation electrodes 108B, 108C are disposed closer to the central support 106 (i.e., within inner slots of the resonator 100) than the electrodes 108A, 108D (i.e. within outer slots of the resonator 100) to improve sensing. However, the arrangement and distribution of the excitation and sensing electrodes 108A-108D can be varied as desired. In further embodiments, additional electrodes can also be used to bias the resonator 100 providing electrostatic tuning or trimming of nonuniformity. Such biasing electrodes can also include multiple separate elements as the excitation and sensing electrodes.

One or more additional electrodes 140, 142 may be disposed adjacent to the planar resonator 100. Although the electrodes 140, 142 are shown as single elements above and below the planar resonator 100, each electrode may comprise multiple distinct elements which may be independently controlled. The upper electrode 140 may be disposed on the inner surface of a housing enclosing the resonator while the lower electrode 142 may be disposed on the baseplate 112. The lower electrode 142 is limited to the available area between the embedded electrodes 108A-108D and the rigid central support 106. The additional electrodes 140, 142 may be used to enhance control of the planar resonator 100. These capacitance electrodes 140, 142 may be used for axial or angular acceleration measurement as well as active damping of the axial and rocking modes of the disc resonator gyroscope.

Operation of the planar resonator 100, e.g. as part of a gyroscope, will be described in the following section. In general, the various electrodes (embedded in the resonator or adjacent to it) are used to drive vibration modes of the planar resonator as well as sense reactions in those modes to movement of the resonator with a control circuit 144 coupled to each electrode. The design of the control circuit 144 may be readily developed by those skilled in the art in accordance with the teaching herein.

FIG. 1C illustrates a pattern 120 for an exemplary planar resonator 100 of the present invention. This pattern 120 employs numerous concentric interleaved circumferential slots 122. Some of the slots, e.g. 122A-122E are wider to accommodate multiple element electrodes. For example, two of the outer rings of wider slots 122A, 122B are for the sensing electrodes and three of the inner rings of wider slots are for the driving electrodes. The remaining slots 122 can serve to structurally tune the resonator 100 (e.g., lower the frequency) and/or they may be occupied by bias electrodes which are used to actively bias the resonator in operation. The resonator and modal axes 124 are indicated; operation of the resonator identifies them as the pattern 120 is symmetric.

Although the exemplary resonator 100 is shown as a disc, other planar geometries using internal sensing and actuation are also possible applying principles of the present invention. In addition, furthermore, the single central support 106 is desirable, providing complete isolation of the resonator, however, other mounting configurations using one or more additional mounting supports are also possible.

As employed in the resonator 100 described above, a centrally supported solid cylinder or disc has two degenerate in-plane radial modes suitable for Coriolis sensing, however the frequencies are very high (greater than 100 KHz) and the radial capacitance sensing area diminishes with cylinder height or disc thickness. However, the multi-slotted disc resonator 100, shown in FIGS. 1A and 1B overcomes these problems. By etching multiple annular slots through the cylinder or disc two immediate benefits result: two degenerate modes suitable for Coriolis sensing with low frequency (less than 50 KHz) and large sense, bias and drive capacitance. The low frequency derives from the increased radial compliance provided by the slots. The large sense, bias and drive capacitance is a consequence of the large number of slots that can be machined into the resonator.

Figure 1D:
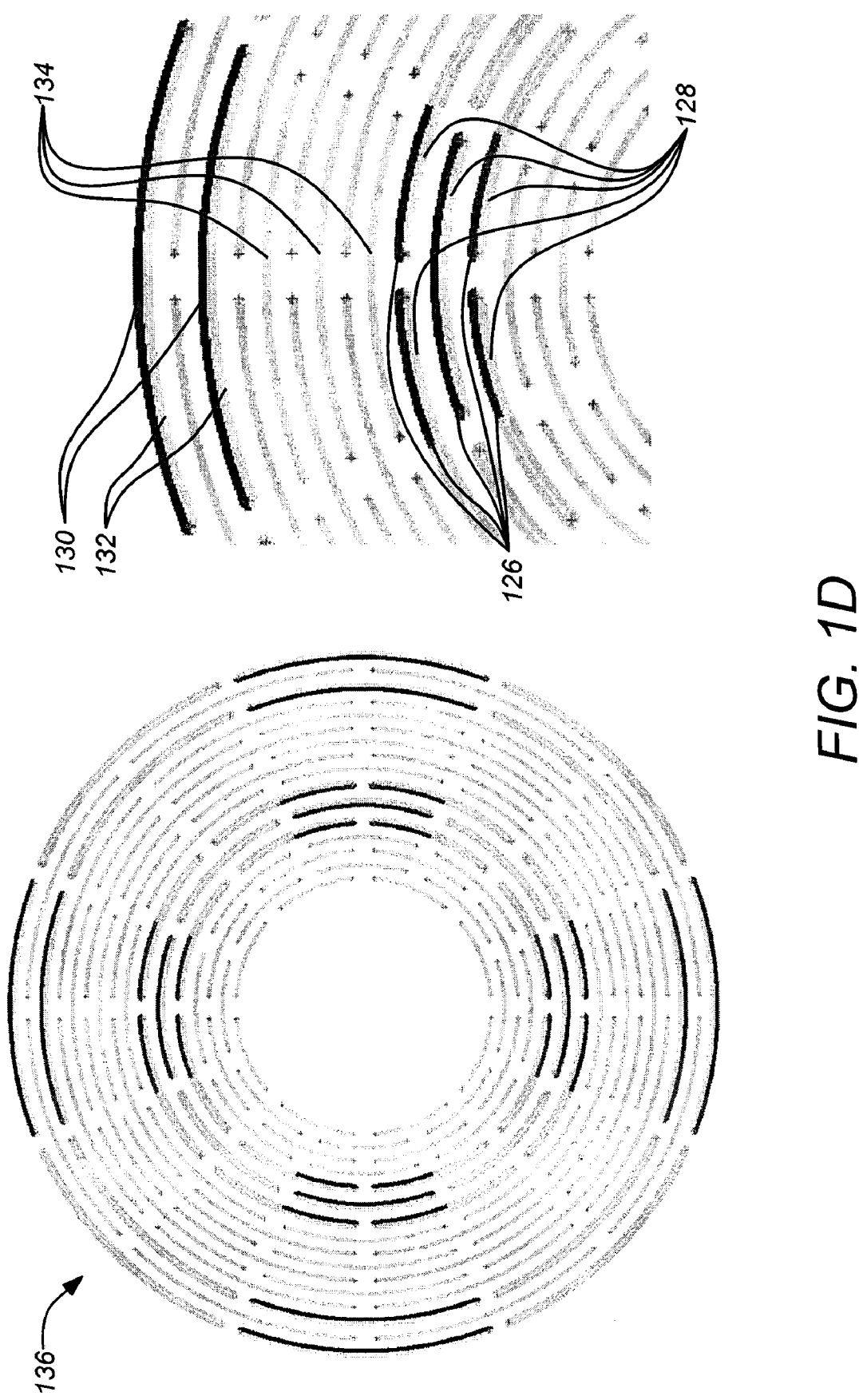
FIG. 1D illustrates conventional electrode operation for a first differential mode of the exemplary resonator.

FIG. 1D illustrates conventional electrode operation for a first differential mode of the resonator of FIG. 1C. The electrodes 136 that operate with a resonator 100 of the pattern 120 are shown in the left image. Four groups of electrodes 124 are used, each at a 90° interval around the circumference of the pattern. The negative excitation elements 126 and positive excitation elements 128, paired elements of the excitation electrodes, are driven to excite the resonator 100. These paired elements 126, 128 share a slot with the negative elements 126 in the outboard position and the positive elements 128 in the inboard position. Note also that as shown some of the pairs share a common slot with other distinct electrode pairs, illustrating that multiple separately operable electrodes can share a common resonator slot. The sensing electrodes are disposed at a larger radial position and include negative sensing elements 130 and positive sensing elements 132 which together provide output regarding motion of the resonator 100.

A uniform radial spacing between slots 116, 122 can be employed, but other spacing may also be used, provided two degenerate radial modes suitable for Coriolis sensing are maintained. In addition, in further embodiments, some or all of the segments 104A-104E can be further slotted such that a single beam segment is further divided into a composite segment including multiple parallel segments. Selective use of such composite segments can be used to adjust the frequency of the resonator as well as eliminate harmful thermoelastic effects on drift performance as the segments are stressed in operation of the resonator. Generally, adding slots to form composite circumferential segments lowers the resonator frequency. The effect of machining errors is also mitigated with multiple slots. Although such composite segments are preferably applied to the circumferential segments 104A-104E, the technique can also be applied to the radial segments 102A-102E or other designs with other segments in other resonator patterns.

Employing the in-plane design described, embodiments of the present invention obtain many advantages over other out-of-plane gyros. For example, the central support bond carries no vibratory loads, eliminating any friction possibility or anchor loss variability. In addition, simultaneous photolithographic machining of the resonator and electrodes is achieved via the slots. Furthermore, diametral electrode capacitances can be summed to eliminate vibration rectification and axial vibration does not change capacitance to a first order. Modal symmetry is also largely determined by photolithographic symmetry not wafer thickness as with other designs. Isolation and optimization of sense capacitance (e.g., from the outer slots) and drive capacitance (e.g., from the inner slots) is achieved. Embodiments of the invention can also achieve a geometric scalable design to smaller or larger diameters and thinner or thicker wafers. In addition, embodiments of the invention can be entirely defined by slots of the same width for machining uniformity and symmetry. Implementation of the present invention can also accommodate silicon anisotropy producing frequency splits. For example, a <111> silicon wafer and/or a varied slot width can be used.

As mentioned above, high thermoelastic damping due to vibration frequency proximity to thermal relaxation resonance can result in short resonance decay times and high gyro drift. However, the slot radial spacing can be adjusted to define an optimum beam width and a number of slots can be additionally etched in between the slots defining the electrode gaps to further reduce the vibrating beam width.

3.0 Operation of a Planar Resonator Gyroscope

Embodiments of the invention are directed to a new technique for operating a planar resonator gyroscope to obtain improved performance. This technique may be illustrated by comparing the original technique for operating a planar resonator gyroscope to that of the present invention. Embodiments of the invention are described hereafter with respect to a disc resonator gyroscope. However, embodiments of the invention are not limited to disc resonator gyroscopes. Those skilled in the art will appreciate that embodiments of the invention are similarly applicable to the operation of gyroscopes based on other planar resonators applying the same principle.

Figure 2A:
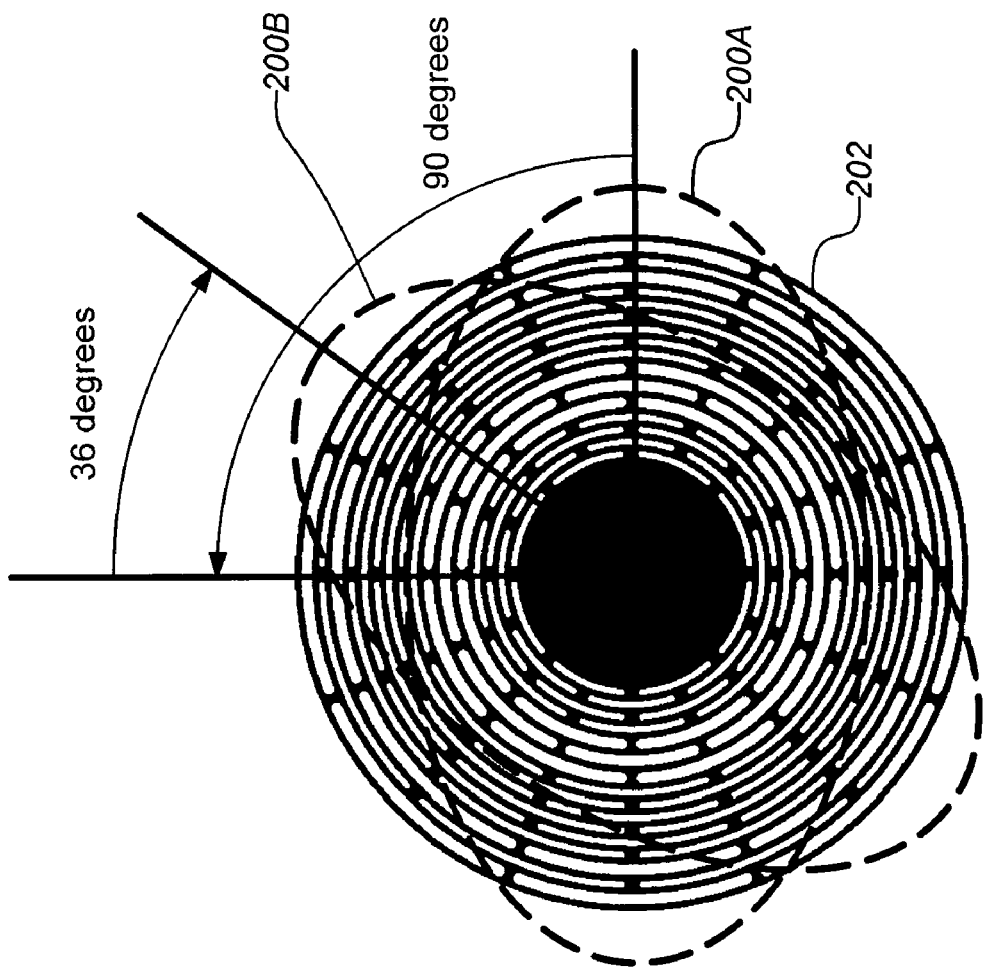
FIG. 2A illustrates the principle of operation of an exemplary disc resonator gyroscope.
Figure 2B:
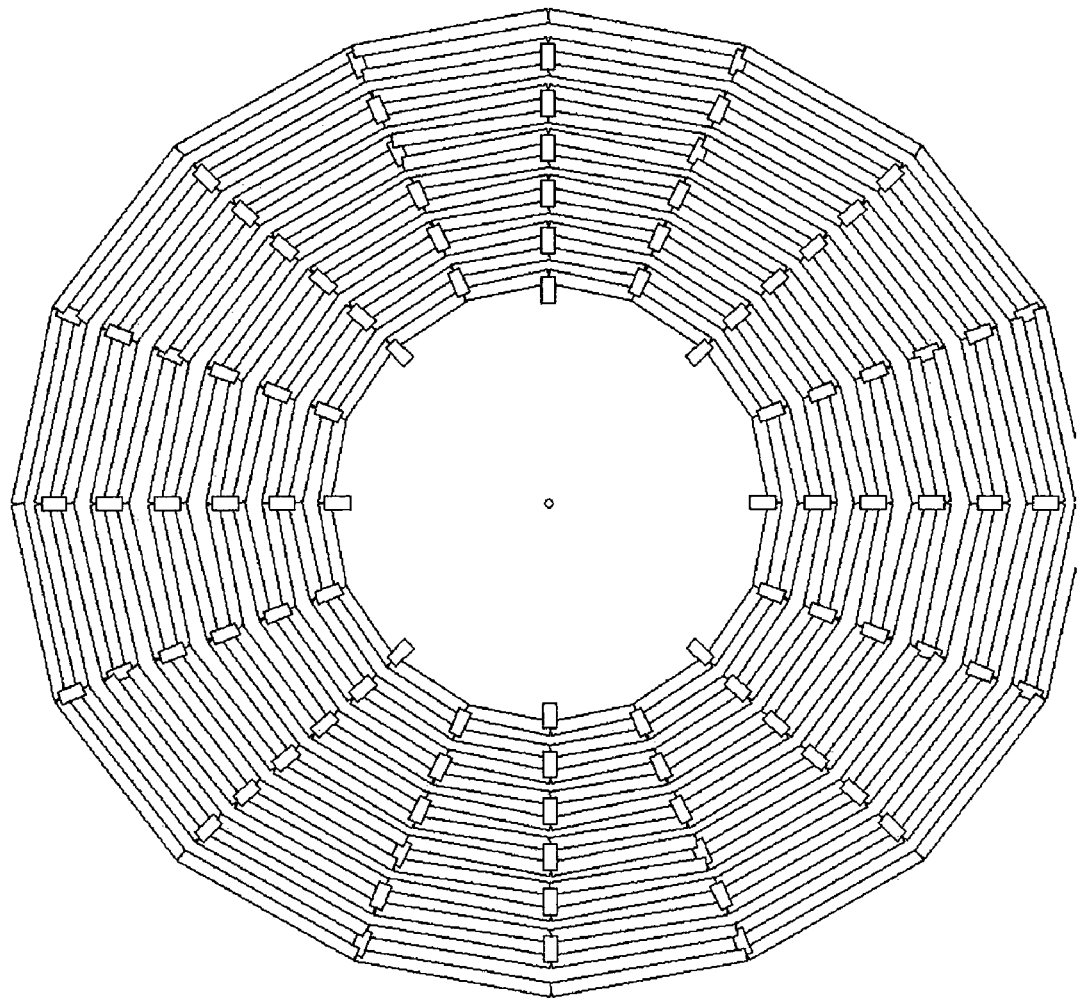
FIG. 2B illustrates the first in-plane, differential, degenerate vibratory mode of an exemplary disc resonator gyroscope.

FIG. 2A illustrates the principle of operation and FIG. 2B illustrates the first in-plane, differential, degenerate vibratory mode of an exemplary disc resonator gyroscope (such as described in FIGS. 1A-1C). The mode is elliptically-shaped and reactionless relative to the rigid central support of the disc resonator 202. This mode is excited at a fixed vibration amplitude and when an inertial rotation is applied as shown in FIG. 2A, its precession is observed via the segmented capacitive electrodes embedded within and adjacent to the interconnected rings that comprise the disc resonator 202 structure. The amount of precession is a precise geometrically-defined fraction of the inertial rotation. In the example shown, the standing wave vibration pattern is illustrated in a first position 200A before the case of the disc resonator 202 is rotated. As the case fixed to the centrally supported disc resonator 202 is rotated ninety degrees as indicated, the precession shifts the standing wave vibration pattern to the second position 200B (approximately thirty-six degrees clockwise in the example). The first in-plane, differential, degenerate vibratory mode of an exemplary disc resonator model of FIG. 2B exhibits a Coriolis-coupled mechanical angular gain of approximately k=0.4. The adjacent electrode segments for sense and control are indicated on the model of the ring structure in FIG. 2B.

Generally, vibratory gyroscopes actively control at least one vibratory Coriolis mode to vibrate at constant amplitude. A second, nearby output Coriolis mode may be either actively forced to zero amplitude or allowed to freely vibrate in order to sense the Coriolis force produced by the combination of the first mode vibration and an input inertial rate along an axis normal to the plane of vibration. A closed loop force to rebalance the amplitude to zero or the open loop precession are indicative of the input inertial rate.

There is an increasing demand for higher performance vibratory gyroscopes which drives higher quality and/or more lightly damped vibration to avoid a false Coriolis rate indication due to damping non-uniformity. A symmetric, centrally supported disc resonator gyroscope inherently provides high quality vibration modes, especially for mm-scale silicon resonators with isothermal flexures, or cm-scale fused silica resonators with adiabatic flexures. However, the difficulty with the current method of vibratory operation at higher mechanical quality is that the parasitic modes of vibration are also less damped and potentially strongly coupled to external vibrations or accelerations.

Figure 3B:
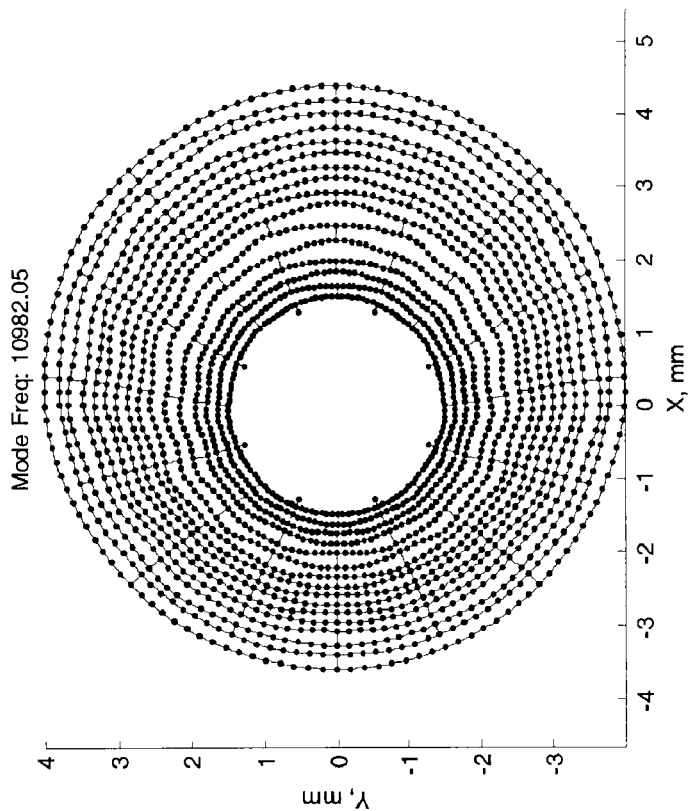
FIGS. 3A & 3B illustrate the first two in-plane, common, degenerate vibration modes with center of mass motion.
Figure 3A:
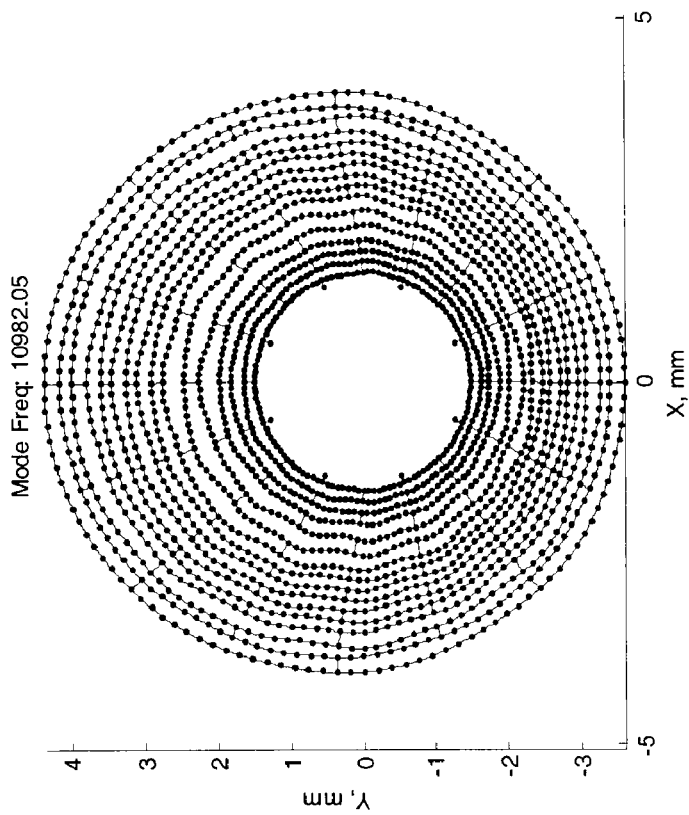

FIGS. 3A & 3B illustrate the first two in-plane degenerate vibration modes with center of mass motion. These are the common modes for the exemplary disc resonator and represent an exemplary parasitic mode pair. The principal modal axes are separated by approximately ninety degrees. Lateral accelerations of the case may directly excite these modes. These can be contrasted with the differential modes.

Figure 4B:
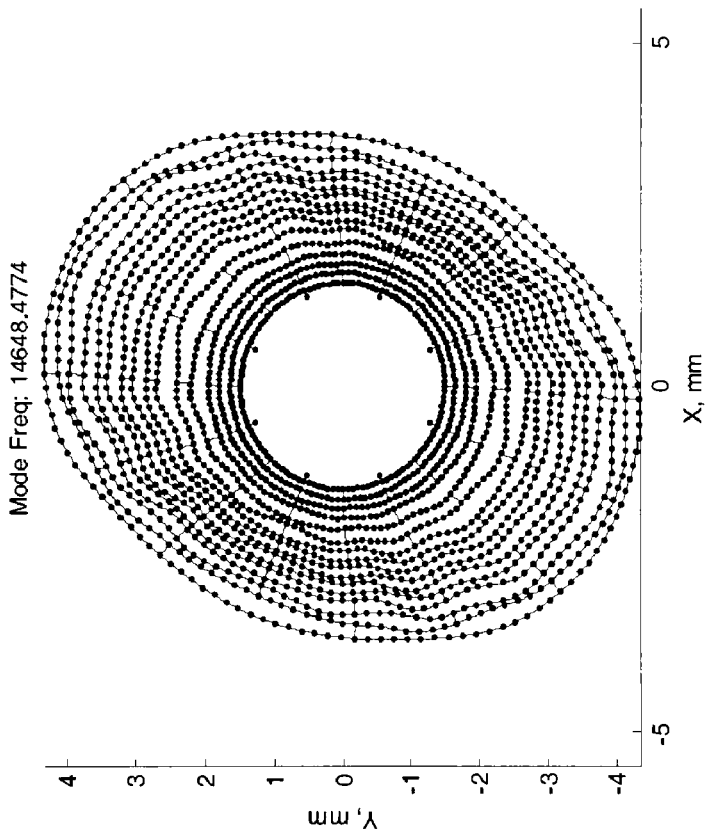
FIGS. 4A & 4B illustrate the first two in-plane, differential, degenerate vibration modes with no center of mass motion.
Figure 4A:
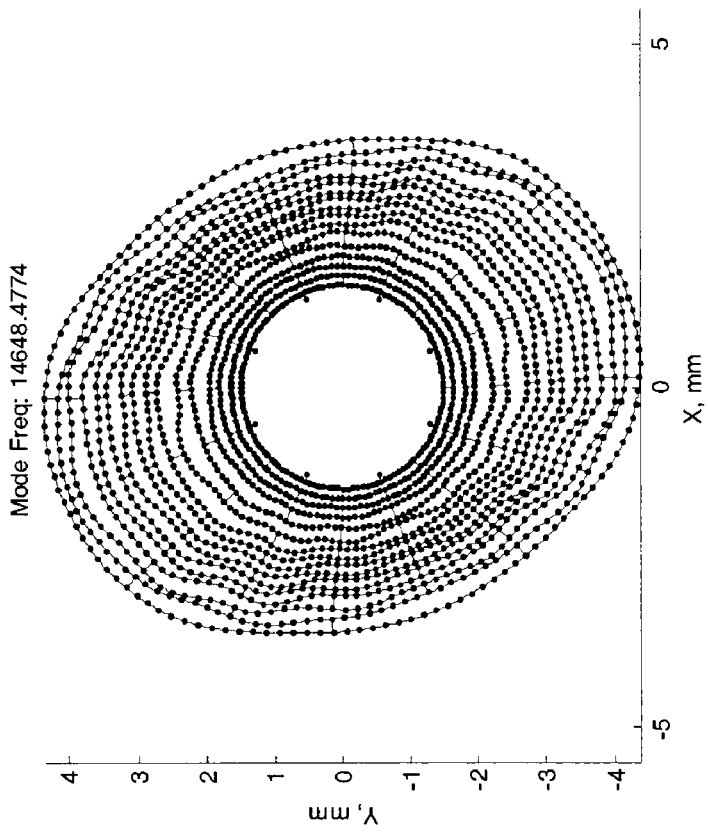

FIGS. 4A & 4B illustrate the first two in-plane degenerate vibration modes with no center of mass motion. These are the differential modes for the exemplary disc resonator and represent a degenerate mode pair. These modes are commonly controlled and sensed for vibratory gyroscope operation and cannot be excited by case acceleration. The principal modal axes are separated by approximately forty-five degrees.

For high performance gyroscopes, lightly damped motion of parasitic modes may be detected by the primary Coriolis mode readout electronics and lead to increased rate noise and drift. For high performance vibratory gyroscopes it would thus be desirable to actively damp or control these parasitic modes. It can be shown that by further partitioning an exemplary disc resonator capacitive drive and sense electrodes so that there is a separable sense and control electrode at an anti-node of each parasitic mode (e.g. the modes of FIGS. 3A & 3B), the parasitic mode can be damped or controlled.

Figure 5:
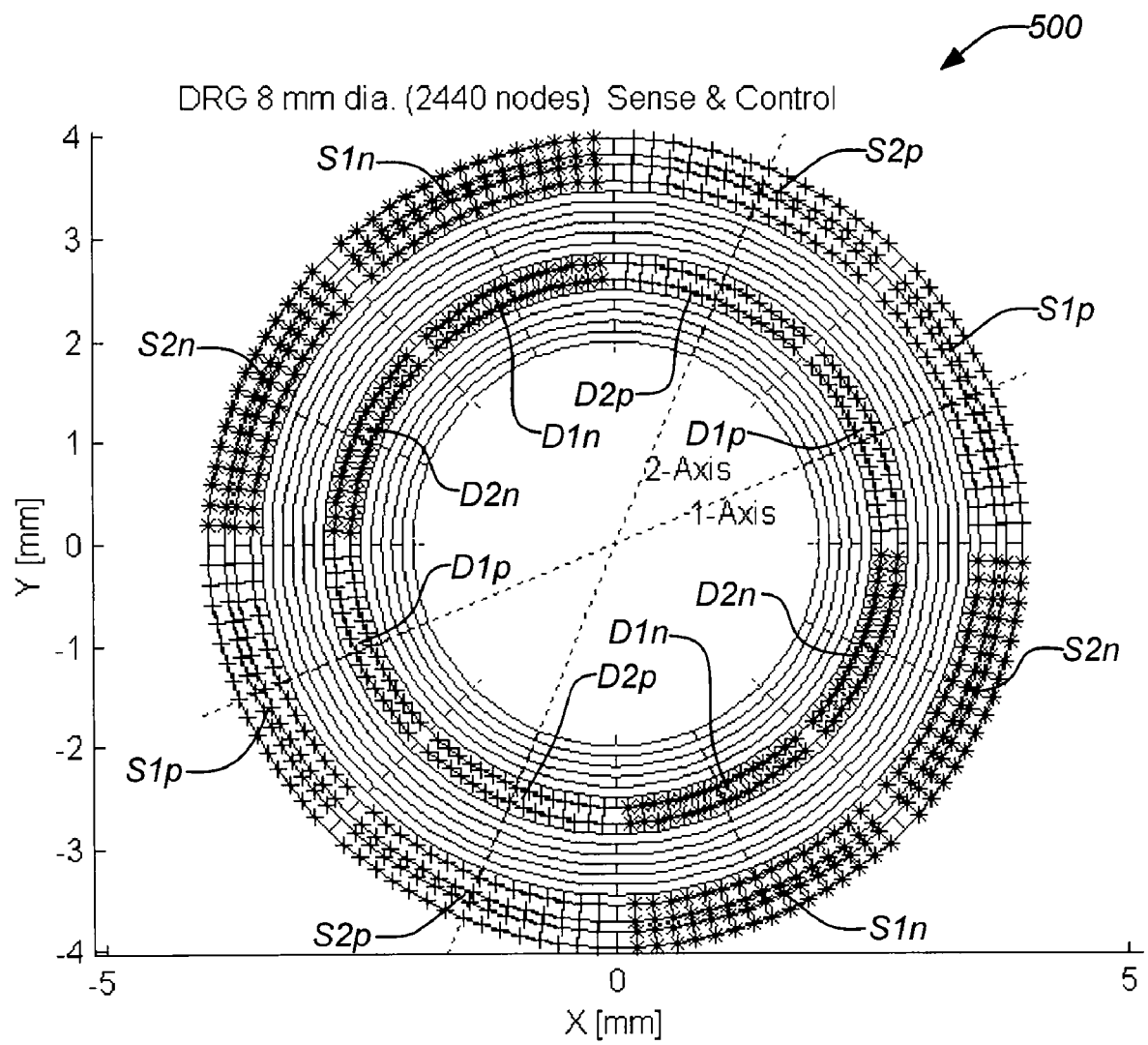
FIG. 5 illustrates a model with sense and control electrodes used under ordinary differential mode operation.

FIG. 5 illustrates a model 500 with sense and control electrodes used under a typical operation. The finite element analysis model 500 comprises 2440 nodes describing internal rings of an exemplary disc resonator with segments marked according to adjacent sense or drive electrodes. The eight capacitance sense electrode segments or sets shown in FIG. 5 are wired into four capacitance pairs, S$1p$, S$1n$, S$2p$, S$2n$, as used in the ordinary operation of a disc resonator gyroscope. In this case, each opposing sense pair of electrodes on opposite sides of the central mounting point of the planar resonator are not differentiated; the electrode pairs are electrically coupled. Similarly the control electrode segments or sets are wired into four capacitive pairs: D$1p$, D$1n$, D$2p$, D$2n$. Here also, each opposing drive pair of electrodes on opposite sides of the central mounting point of a planar resonator are not differentiated. Note that the electrodes may be wired through conductive patterns disposed on the baseplate supporting the disc resonator which are connected to a control circuit (e.g., as shown schematically in FIG. 1B). Sense and drive electrodes in the distinct regions of the resonator model are denoted by "*" or "+" and labeled S$1p$, S$1n$, S$2p$, S$2n$, D$1p$, D$1n$, D$2p$, or D$2n$ in FIG.

The disc resonator structure may be biased to a voltage VGB and four transimpedance capacitance sense buffers referenced to ground may be used to measure charge to yield output voltages VS$1p$, VS$1n$, VS$2p$, VS$2n$. For sense and control of the first two in-plane differential modes with respect to identified axes 1 and 2, parameters may be defined as follows.

$$VS1 = VS1p - VS1n \quad (1)$$

$$VS2 = VS2p - VS2n \quad (2)$$

$$VD1p = -VD1n = VD1 \quad (3)$$

$$VD2p = -VD2n = VD2 \quad (4)$$

This Coriolis sensor interface is described in U.S. Pat. 6,467,346 by Challoner et al., issued Oct. 22, 2002 which is incorporated by reference herein. In contrast, embodiments of the present invention sense and damp parasitic modes and may employ partitioning of the drive and sense electrode pairs and utilizing a differential signal between each pair to enhance control of the gyroscope and improve performance as described hereafter.

Figure 6A:
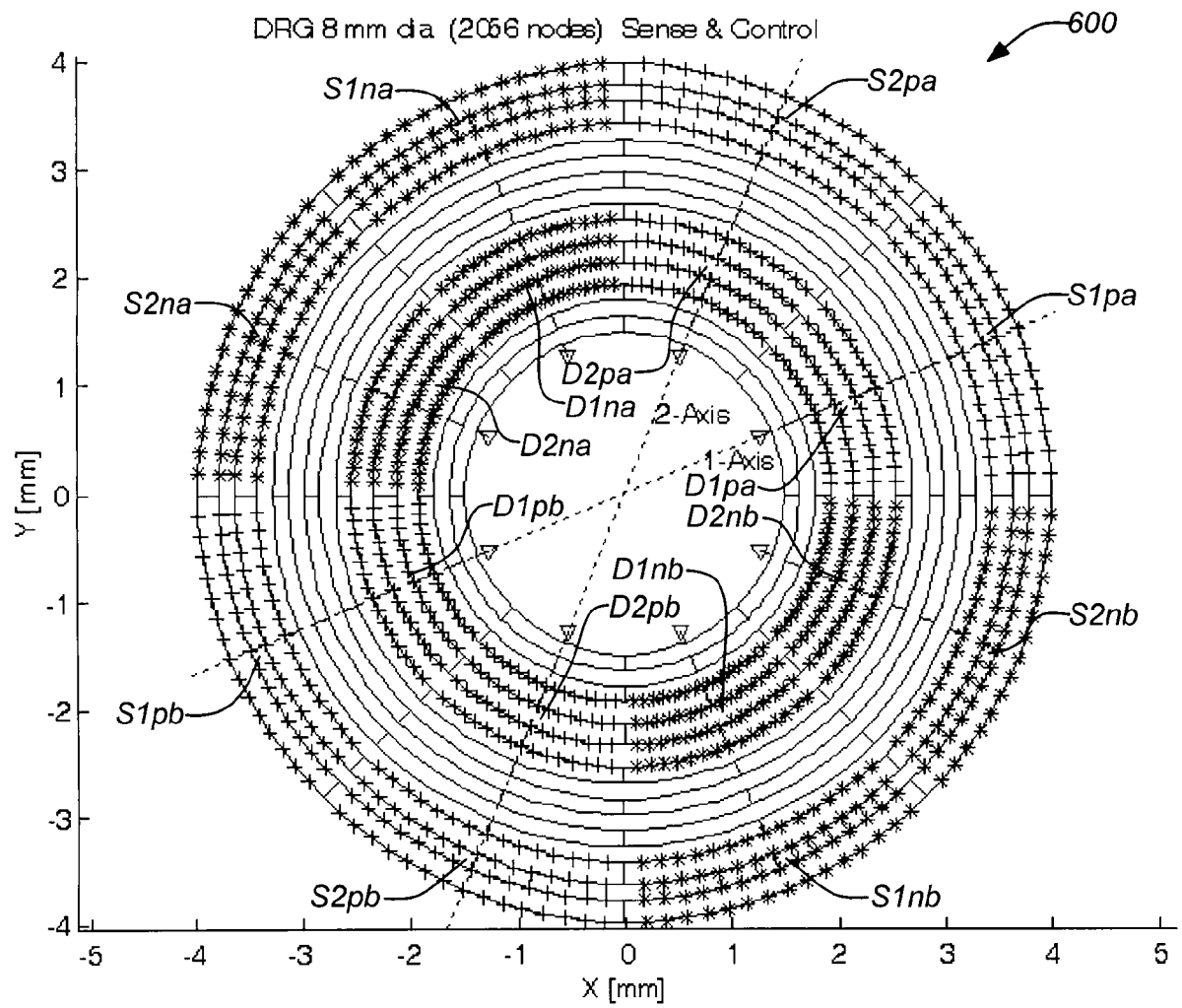
FIG. 6A illustrates an exemplary model with extensive sense and control electrodes used under operation according to the present invention.

FIG. 6A illustrates an exemplary model 600 with sense and control electrodes used under operation according to the present invention. The finite element analysis model 600 comprises 2056 nodes describing internal rings of an exemplary disc resonator with segments marked according to adjacent sense or drive electrodes. Here, the electrode pairs are partitioned into "a" and "b" elements which are electrically distinguished. For sense and control to actively damp the first two in-plane common modes, the mask wiring may be altered over that of FIG. 5 so that distinct access to all eight capacitive sense electrodes (four opposing electrode pairs), S$1pa$, S$1pb$, S$1na$, S$1nb$, S$2pa$, S$2pb$, S$2na$, S$2nb$, is retained. Similarly, distinct access to the drive electrodes D$1pa$, D$1pb$, D$1pa$, D$1nb$, D$2pa$, D$2pb$, D$2na$, D$2nb$ is also retained.

The disc resonator structure may be biased to a voltage VGB and eight transimpedance capacitance sense buffers referenced to ground may be used to measure charge to yield output voltages VS$1pa$, VS$1pb$, VS$1na$, VS$1nb$, VS$2pa$, VS$2pb$, VS$2na$, and VS$2nb$. Utilizing the eight transimpedance capacitance sense buffers (also referred to as transimpedance amplifiers) the following differential signals between the electrode pairs may be defined. An interface similar to that described in U.S. Pat. No 6,467,346 may be employed in one example.

$$VS1' = VS1pa - VS1pb + VS2pa - VS2pb \quad (5)$$

$$VS2' = VS1na - VS1nb + VS2na - VS2nb \quad (6)$$

$$VD1pa = -VD1pb = VD2pa = -VD2pb = VD1' \quad (7)$$

$$VD2na = -VD1nb = VD2na = -VD2nb = VD2' \quad (8)$$

providing full common mode observability and control while full differential mode observability and control may be maintained by defining the following signals $$VS1 = VS1pa + VS1pb - VS1na - VS1nb \quad (9)$$

$$VS2 = VS2pa + VS2pb - VS2na - VS2nb \quad (10)$$

$$VD1pa = VD1pb = -VD1na = -VD1nb = VD1 \quad (11)$$

$$VD2pa = VD2pb = -VD2na = -VD2nb = VD2 \quad (12)$$

Active damping may be implemented with anti-node sense and control capacitance signal pairs, VS1', VD1' and VS2', VD2' providing damping each of the parasitic in-plane common modes. The active damping may be simply applied with analog operational amplifier or digital feedback using the following exemplary control law.

$$VD1' = -K * VD1' \quad (13)$$

$$VD2' = -K * VD2' \quad (14)$$

Feedback gain may be selected to define the damping time constant. The transimpedance amplifier signals are proportional to modal velocity so this simple proportional capacitive force feedback is sufficient.

Other capacitive motion sensors may be employed such as a high impedance voltage follower or bootstrap buffer in place of the transimpedance amplifier. A narrow bandpass filter centered on the parasitic mode frequency may also be employed in series with the feedback gain, K to prevent any disturbance at the differential mode sensing frequency due to slight mismatch in the differential electrodes used to provide parasitic common mode damping.

Capacitance electrodes adjacent to the planar resonator, e.g., above and/or below the interconnected rings of the disc resonator gyroscope, may also be used for active damping of the axial and rocking modes of the disc resonator gyroscope.

Figure 6B:
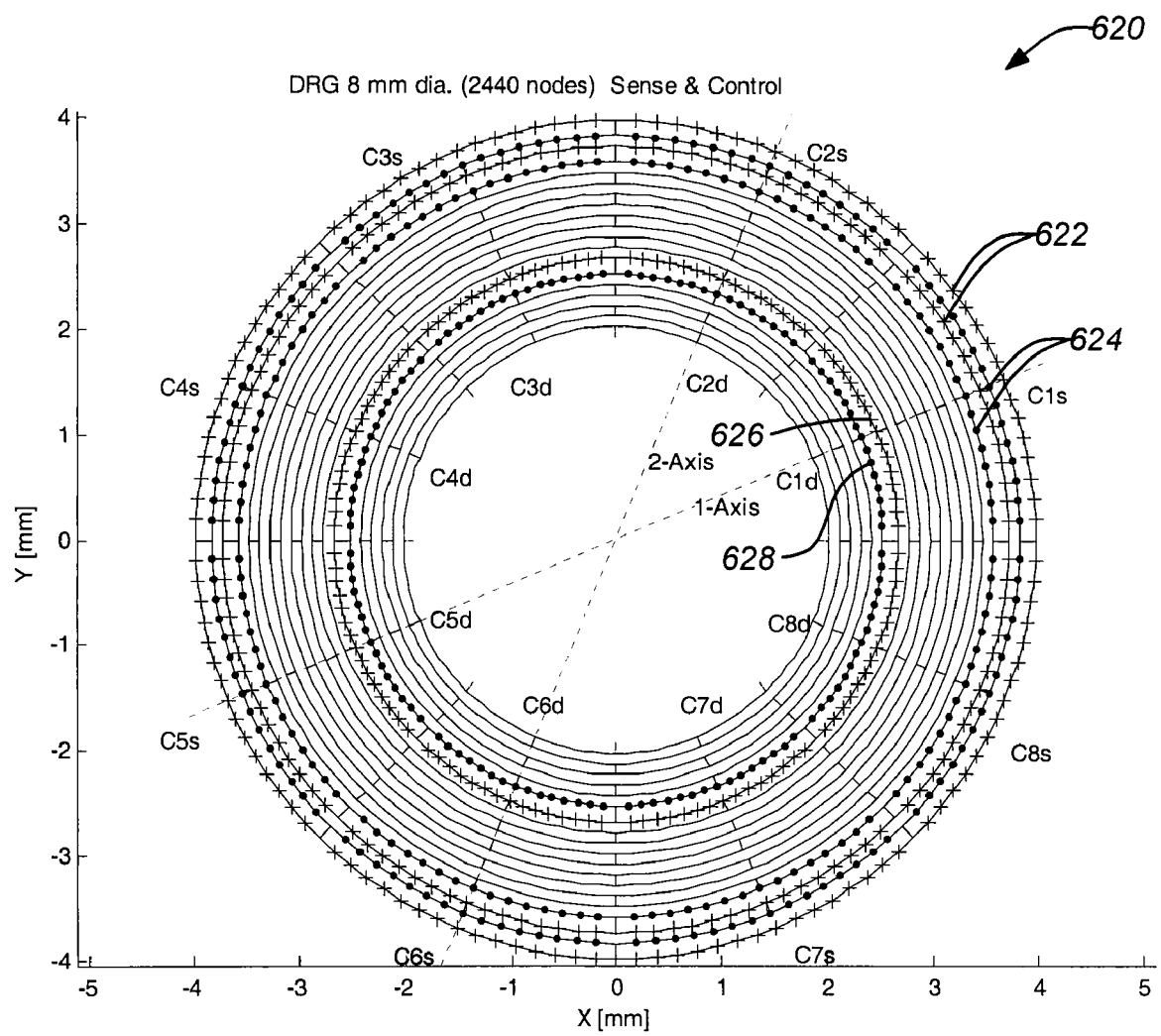
FIG. 6B illustrates a second exemplary model with sense and control electrodes used under operation according to the present invention.

FIG. 6B illustrates a second exemplary model 620 with sense and control electrodes used under operation according to the present invention. In this case, the multiple interconnected rings of an exemplary 8 mm diameter disc resonator are depicted in the model 620. The various embedded electrodes are not shown for clarity, but rather the resulting sense and drive electrode capacitances are designated for each octant and described hereafter.

Typical segmented electrodes of the DRG are as depicted in FIG. 1D and the multiple interconnected rings of the resonator disc are as depicted in FIG. 1C. Sense and drive electrodes for each octant are embedded in the circumferential slots and each electrode is further split into an inboard and an outboard segment (as previously describe in FIG. 1D). The embedded electrodes are not shown for the sake of clarity on FIG. 6B. The inboard and outboard electrodes are indicated, respectively, by a "+" or a "●" on their adjacent ring segments in FIG. 6B. Each electrode in FIG. 6B may be referenced by the following coding. An "s" indicates a sense electrode and a "d" indicates a drive electrode. Odd numbers, 1, 3, 5 and 7, identify electrodes groups about the first axis and its orthogonal. Similarly, even numbers, 2, 4, 6, and 8, identify electrode groups about the second axis and its orthogonal. As an example, the sense electrodes about one side of the first axis are identified as "C1so" for the outboard sense electrode 622 and "C1si" for the inboard sense electrode 624. The drive electrodes about the same side of the first axis are "C1do" for the outboard drive electrode 626 and "C1di" for the inboard drive electrode. Each of the electrodes in each octant are similarly identified. ("C" indicates a capacitance, applicable to all the electrodes.) The inboard and outboard electrodes for each octant are electrically connected to produce inboard and outboard sense and drive capacitances. Outward ring motion relative to an outboard electrode (outboard relative to its adjacent ring segment) will produce a smaller gap and hence an increasing outboard capacitance. It should be noted that the sense electrodes around the periphery of the resonator are set in two slots. This means that two rows are shown for each particular sense electrode. This nomenclature is applicable to the operations description and control equations hereafter.

For the operation as a gyroscope using two degenerate differential modes, the sense and drive capacitances for the two modes may be electrically connected as indicated by the following equations.

$$CS1p = C1so + C5so + C3si + C7si \quad (15)$$

$$CS1n = C1si + C5si + C3so + C7so \quad (16)$$

$$CS2p = C2so + C6so + C4si + C8si \quad (17)$$

$$CS2n = C2si + C6si + C4so + C8so \quad (18)$$

$$CD1p = C1do + C5do + C3di + C7di \quad (19)$$

$$CD1n = C1di + C5di + C3do + C7do \quad (20)$$

$$CD2p = C2do + C6do + C4di + C8di \quad (21)$$

$$CD2n = C2di + C6di + C4do + C8do \quad (22)$$

Using a resonator bias voltage VGB and transimpedance amplifiers with feedback resistance Rf then the output sense voltages associated with the sense capacitors may be given as follows.

$$VS1p = -VGB*Rf*d(CS1p)/dt \quad (23)$$

$$VS1n = -VGB*Rf*d(CS1n)/dt \quad (24)$$

$$VS2p = -VGB*Rf*d(CS2p)/dt \quad (25)$$

$$VS2n = -VGB*Rf*d(CS2n)/dt \quad (26)$$

Differential mode sense signals VS1 and VS2 are then defined the combination of the output sense voltages as follows.

$$VS1 = VS1p - VS1n \quad (27)$$

$$VS2 = VS2p - VS2n \quad (28)$$

To produce electrostatic drive forces proportional to voltages VD1 and VD2 to control the two differential modes, the voltages applied to the drive capacitances, CD1p, CD1n, CD2p, CD2n are given as follows.

$$VCD1p = -VCD1n = VD1 \quad (29)$$

$$VCD2p = -VCD2n = VD2 \quad (30)$$

This original capacitance interconnection prevents direct observability of the parasitic common modes.

With changes to the capacitance interconnection wiring the antinodes of the two parasitic common modes can be sufficiently sensed and damped with the electrodes in the four odd-numbered octants of FIG. 6B. Using eight transimpedance amplifiers the eight sense capacitances can be sensed and combined to provide independent observability of both common modes and the differential mode aligned with the first axis as follows.

$$VC1so = -VGB*Rf*d(C1so)/dt \quad (31)$$

$$VC1si = -VGB*Rf*d(C1si)/dt \quad (32)$$

$$VC3so = -VGB*Rf*d(C3so)/dt \quad (33)$$

$$VC3si = -VGB*Rf*d(C3si)/dt \quad (34)$$

$$VC5so = -VGB*Rf*d(C5so)/dt \quad (35)$$

$$VC5si = -VGB*Rf*d(C5si)/dt \quad (36)$$

$$VC7so = -VGB*Rf*d(C7so)/dt \quad (37)$$

$$VC7si = -VGB*Rf*d(C7si)/dt \quad (38)$$

$$VS1p = VC1so + VC5so + VC3si + VC7si \quad (39)$$

$$VS1n = VC1si + VC5si + VC3so + VC7so \quad (40)$$

The differential mode sense voltage for the first axis is formed by the following equation.

$$VS1 = VS1p - VS1n \quad (41)$$

To produce electrostatic drive forces proportional to voltage VD1 to control the first axis differential mode then the voltages applied to the odd-numbered drive capacitances are given as follows.

$$VC1do = VC5do = VC3di = VC7di = VD1 \quad (42)$$

$$VC1di = VC5di = VC3do = VC7do = -VD1 \quad (43)$$

The second axis differential mode may be sensed and driven as in the original configuration described in Equations (15) to (30).

For the purpose of sensing and damping the two parasitic common modes the following signals are produced $$VS1p' = VC1so + VC5si \quad (44)$$

$$VS1n' = VC1si + VC5so \quad (45)$$

$$VS2p' = VC3so + VC7si \quad (46)$$

$$VS2n' = VC3si + VC7so \quad (47)$$

The two common mode sense voltages are given by the following relations.

$$VS1' = VS1p' - VS1n' \quad (48)$$

$$VS2' = VS2p' - VS2n' \quad (49)$$

To produce electrostatic drive forces proportional to voltage VD1' and VD2' to control the two parasitic common modes and proportional to VD1 to control the first axis differential mode, the voltages applied to the odd-numbered drive capacitances are given as follows.

$$VC1do = VD1' + VD1 \quad (50)$$

$$VC1di = -VD1'VD1 \quad (51)$$

$$VC3do = VD2' - VD1 \quad (52)$$

$$VC3di = -VD2' + VD1 \quad (53)$$

$$VC5do = -VD1' + VD1 \quad (54)$$

$$VC5di = VD1' - VD1 \quad (55)$$

$$VC7do = -VD2' - VD1 \quad (56)$$

$$VC7di = VD2' + VD1 \quad (57)$$

Since VS1' and VS2' are proportional to rate of change of capacitance or resonator velocity the active damping of the two parasitic common modes is then simply implemented by means of proportional negative feedback:

$$VD1' = K*F(s)*VS1' \quad (58)$$

$$VD2' = K*F(s)*VS2' \quad (59)$$

K is a fixed gain and F(s) is an optional narrow bandpass filter centered on the common mode frequency that may be used to prevent any feedback at the differential mode frequency.

Figure 6C:
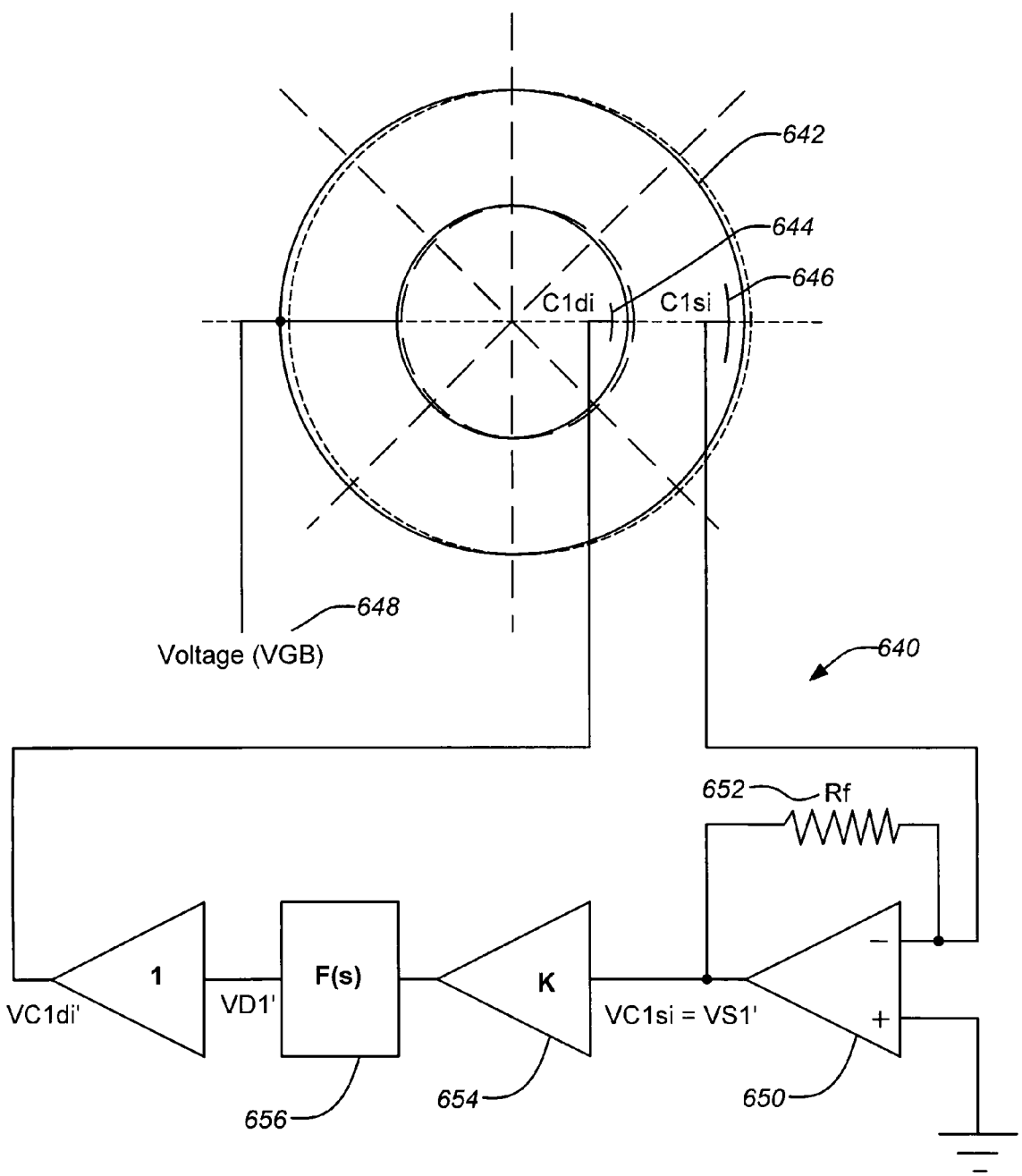
FIG. 6C is a diagram of an exemplary control circuit for an embodiment of the invention.

FIG. 6C is a diagram of an exemplary control circuit 640 for an embodiment of the invention as described in FIG. 6B. A simplified view of a disc resonator 642, electrodes 644, 646 and circuit 640 arrangement for parasitic mode damping is illustrated where only two resonator rings of a disc resonator 642 are shown along with the parasitic mode deflections. Only one outboard sense capacitance, C1si, of sense electrode 646 and one outboard drive capacitance, C1di, of drive electrode 644 are shown. Additional sense and drive electrodes may be added and electrically connected, e.g. as described in the example of FIG. 6B. The sense electrode 646 is peripheral to the drive electrode 644 on the centrally mounted disc resonator 642. A bias voltage 648 (VGB) is applied to the resonator 642. The sense electrode 646 is coupled to a transimpedance amplifier 650 which yields an output sense voltage, VS1', through the Rf feedback resistance 652. In this simplified case, the output sense voltage VS1' may be essentially applied directly to the drive electrode 644 with proportional negative feedback. A fixed gain amplifier 654 may be used to provide the proportional negative feedback. Optionally, a narrow bandpass filter 656 may be included centered on the common mode frequency to minimize feedback at the differential mode frequency.

Furthermore, an example of digital gyro control electronics which may be similarly applied to embodiments of the present invention as understood by those skilled in the art can be found in U.S. Pat. No. 6,915,215 by M'Closkey et al., issued Jul. 5, 2005, which is incorporated by reference herein.

Figure 7:
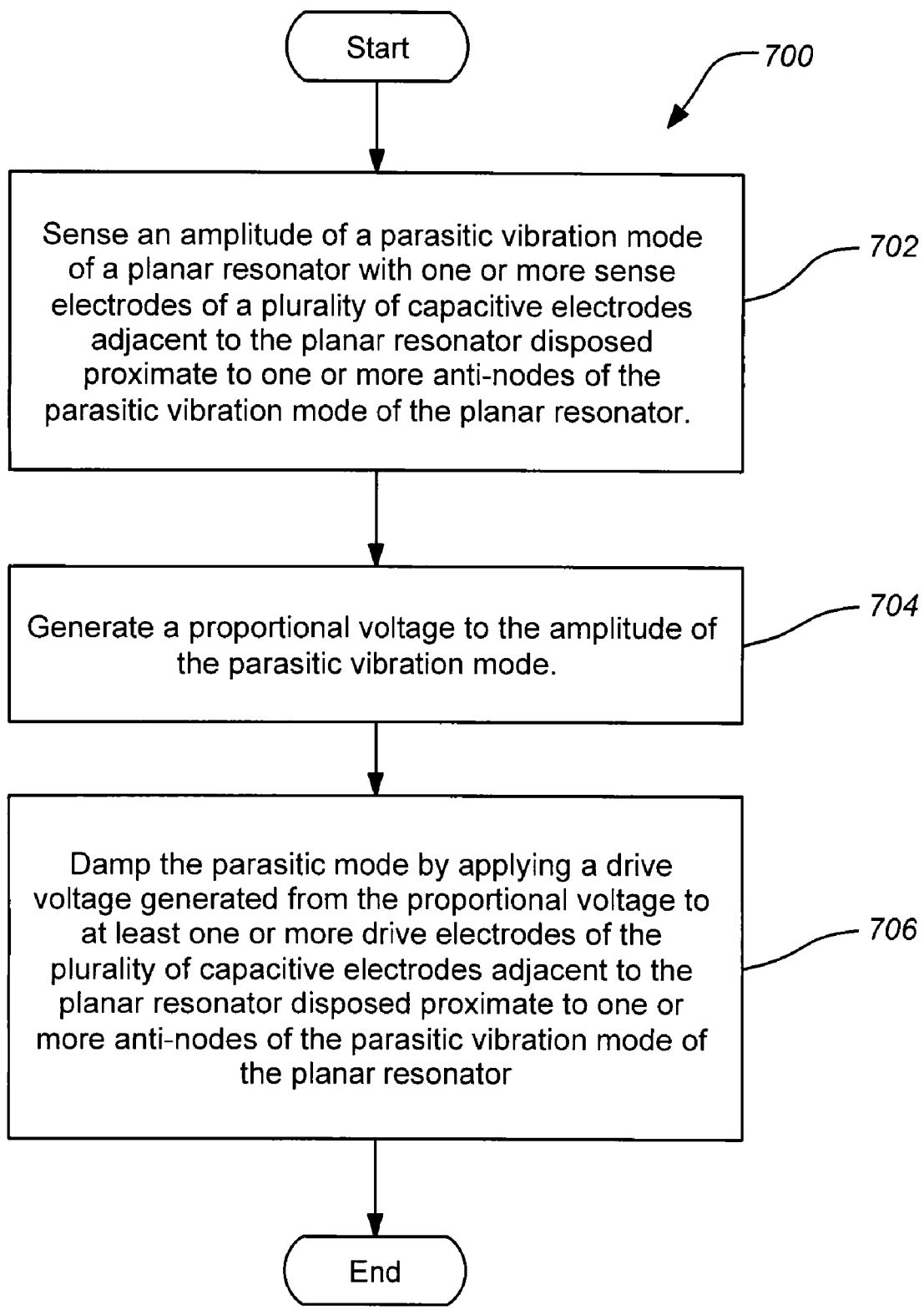
FIG. 7 is a flowchart of an exemplary method of operating a planar resonator according to the present invention.

FIG. 7 is a flowchart of an exemplary method of operating a resonator according to the present invention. The method 700 begins with an operation 702 of sensing an amplitude of a parasitic vibration mode of a planar resonator with one or more sense electrodes of a plurality of capacitive electrodes adjacent to the planar resonator disposed proximate to one or more anti-nodes of the parasitic vibration mode of the planar resonator. Next, in operation 704 a proportional voltage to the amplitude of the parasitic vibration mode is generated. Lastly, in operation 706, the parasitic mode is damped by applying a drive voltage generated from the proportional voltage to at least one or more drive electrodes of the plurality of capacitive electrodes adjacent to the planar resonator disposed proximate to one or more anti-nodes of the parasitic vibration mode of the planar resonator. This basic method 700 may be further modified as described above, to achieve active damping and/or position feedback for example.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. A method of operating a planar resonator, comprising the steps of:
   sensing an amplitude of a parasitic vibration mode of a planar resonator with one or more sense electrodes of a plurality of capacitive electrodes adjacent to the planar resonator disposed proximate to one or more anti-nodes of the parasitic vibration mode of the planar resonator;
   generating a proportional voltage to the amplitude of the parasitic vibration mode; and
   damping the parasitic mode by applying a drive voltage generated from the proportional voltage to at least one or more drive electrodes of the plurality of capacitive electrodes adjacent to the planar resonator disposed proximate to the one or more anti-nodes of the parasitic vibration mode of the planar resonator.

2. The method of claim 1, wherein the planar resonator comprises a disc resonator.

3. The method of claim 2, wherein the disc resonator comprises a centrally mounted and circumferentially slotted disc and the plurality of capacitive electrodes comprise embedded electrodes within the disc resonator.

4. The method of claim 3, wherein the one or more sense electrodes are peripheral to the one or more drive electrodes around the disc resonator.

5. The method of claim 1, wherein the planar resonator is operated as a gyroscope to measure rotation of the planar resonator.

6. The method of claim 1, wherein the one or more sense electrodes comprise a plurality of partitioned sense electrodes to provide a differential sense signal to sense the amplitude of the parasitic vibration mode.

7. The method of claim 6, wherein the planar resonator comprises disc resonator having a central mounting point and the plurality of partitioned sense electrodes to sense the amplitude of the parasitic vibration mode are partitioned between one or more inboard sense electrodes and one or more outboard sense electrodes.

8. The method of claim 1, wherein the proportional voltage is generated with an analog control circuit.

9. The method of claim 1, wherein the proportional voltage is generated with a digital control circuit.

10. The method of claim 1, wherein applying the drive voltage comprises actively controlling a common mode position and velocity using wideband DC capacitive sensing.

11. A sensor, comprising:
    a planar resonator;
    a plurality of capacitive electrodes disposed adjacent to the planar resonator and proximate to one or more anti-nodes of a parasitic vibration mode of the planar resonator, the plurality of capacitive electrodes including one or more sense electrodes for sensing an amplitude of the parasitic vibration mode of the planar resonator;

a sensing circuit for generating a proportional voltage to the amplitude of the parasitic vibration mode; and a feedback controller for damping the parasitic mode by applying a drive voltage generated from the proportional voltage to at least one or more drive electrodes of the plurality of capacitive electrodes adjacent to the planar resonator disposed proximate to the one or more anti-nodes of the parasitic vibration mode of the planar resonator.

12. The sensor of claim 11, wherein the planar resonator comprises a disc resonator.

13. The sensor of claim 12, wherein the disc resonator comprises a centrally mounted and circumferentially slotted disc and the plurality of capacitive electrodes comprise embedded electrodes within the disc resonator.

14. The sensor of claim 13, wherein the one or more sense electrodes are peripheral to the one or more drive electrodes around the disc resonator.

15. The sensor of claim 11, wherein the planar resonator is operated as a gyroscope to measure rotation of the planar resonator.

16. The sensor of claim 11, wherein the one or more sense electrodes comprise a plurality of partitioned sense electrodes to provide a differential sense signal to sense the amplitude of the parasitic vibration mode.

17. The sensor of claim 16, wherein the planar resonator comprises disc resonator having a central mounting point and the plurality of partitioned sense electrodes to sense the amplitude of the parasitic vibration mode are partitioned between one or more inboard sense electrodes and one or more outboard sense electrodes.

18. The sensor of claim 11, wherein the proportional voltage is generated with an analog control circuit.

19. The sensor of claim 11, wherein the proportional voltage is generated with a digital control circuit.

20. The sensor of claim 11, wherein applying the drive voltage comprises actively controlling a common mode position and velocity using wideband DC capacitive sensing.

* * * * *